O. JUNGGREN.
ELASTIC FLUID TURBINE.
APPLICATION FILED DEC. 6, 1918.
1,326,867.
Patented Dec. 30, 1919.
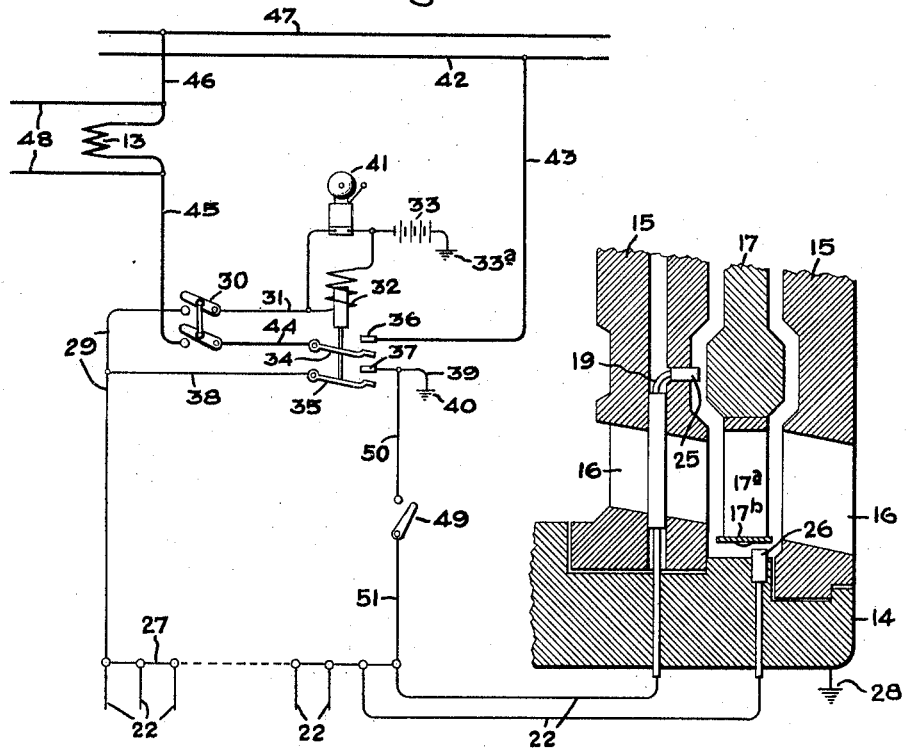
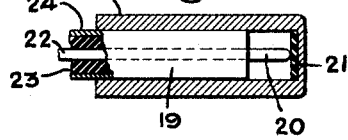
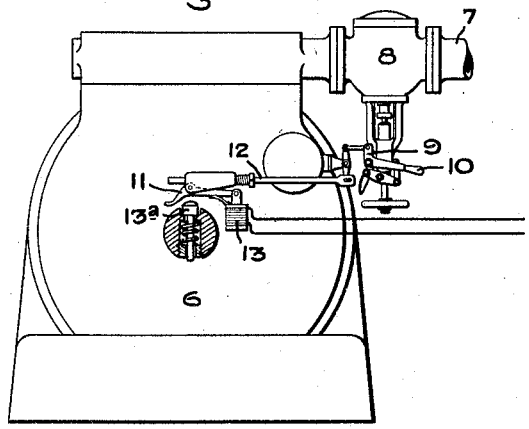
Inventor:
Oscar Junggren,
by Albert G. Davis
His Attorney.

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

ELASTIC-FLUID TURBINE.

1,326,867.     Specification of Letters Patent.     Patented Dec. 30, 1919.

Application filed December 6, 1918. Serial No. 265,638.

*To all whom it may concern:*

Be it known that I, OSCAR JUNGGREN, a citizen of the United States, residing at Schenectady, in the county of Schenectady, State of New York, have invented certain new and useful Improvements in Elastic-Fluid Turbines, of which the following is a specification.

The present invention relates to elastic-fluid turbines and has for its object to provide an improved arrangement in a turbine whereby whenever relatively moving parts approach so closely to each other as to be likely to rub and cause damage an alarm will be given, or the machine will be automatically shut down, or both. Elastic-fluid turbines are built to run with close clearances and rubbing may result for example from unequal expansion due to temperature changes, from buckling or deflection of certain parts, from a wheel loosening on the shaft, or from a bucket cover coming loose. By my invention I aim to guard against damage to the machine whenever from any cause clearances are impaired to such an extent as to be likely to cause damage.

For a consideration of what I believe to be novel and my invention, attention is directed to the accompanying specification and the claims appended thereto.

In the drawing, Figure 1 is a diagrammatic view illustrating my invention; Fig. 2 is a section through one form of contacting device, and Fig. 3 is an outline of an elastic-fluid turbine illustrating one form of connection of a tripping coil to a valve mechanism for shutting down the machine.

In carrying out my invention I provide at points in the turbine where the clearances are likely to be impaired suitable devices which project into the clearance spaces a limited amount and which when engaged or rubbed due to an impairment of a clearance space act to effect the operation of a signal or signals, or the shutting down of the machine, or both. The signal or signals may be of any suitable form, as for example a bell, a whistle, a horn, or a light, and the shutting down of the machine may advantageously be effected by tripping the usual emergency valve mechanism with which turbines are always provided.

Preferably the devices referred to above are in the form of electric contact devices which are carried by stationary parts of the turbine and project into the clearance spaces in such a way that when engaged by an adjacent rotating part they will be quickly operated to affect the connections of an electric circuit in such manner as to effect the actuation of the device or devices in the circuit. Obviously any suitable open or closed circuit arrangement may be used.

Referring now to the drawing which illustrates an embodiment of my invention, 6 indicates an elastic-fluid turbine to which motive fluid is admitted by a conduit 7 in which is located a suitable emergency valve mechanism 8. Emergency valve mechanism 8 is shown as being of a known type adapted to be tripped by a movement of the lever arm 9 toward the left which may be done manually by hand lever 10 or automatically whenever trip finger 11 releases the spring-pressed rod 12. Trip finger 11 is moved to release rod 12 whenever electromagnet or trip coil 13 is energized, or whenever the speed of the turbine becomes such as to cause the spring-pressed emergency governor plunger 13ª to fly out and strike trip finger 11. It will be understood of course that the arrangement of valve 8 and the parts associated therewith illustrated is only by way of example and that any suitable arrangement may be used.

In the present instance a turbine of the type comprising a casing divided into stages by diaphragms with bucket wheels in the stages is shown, and in Fig. 1, 14 indicates a portion of a turbine casing, 15 indicates diaphragms having nozzle partitions 16, and 17 indicates a bucket wheel. Bucket wheel 17 carries a group of buckets 17ª to the outer ends of which is fixed a bucket cover 17ᵇ. Fig. 1 shows only a fragment of a turbine and it will be understood that a complete machine, as shown in Fig. 3, may comprise any number of stages, each containing one or more bucket wheels. Carried by stationary parts of the turbine at such points as it is found desirable and projecting into the clearance spaces are contact devices, as shown in Fig. 2, each of which comprises a metal cap 18 which slips over the end of an insulated wire 19. The insulation is cut back at the end of the wire leaving an exposed end 20 which rests against a piece of insulation 21 in the bottom of cap 18. The use of insulation 21 in the bottom of cap 18 insures that the end 20 of the conductor is spaced the desired or correct distance from the bottom of the cap and makes the fitting of the cap into place a simple matter. For the insulated wire 19 I preferably use what is known as sheathed wire which comprises a conductor 22 surrounded by insulating material 23 and inclosed in a metallic casing 24. Cap 18 is made to fit snugly over casing 24 and is preferably brazed or soldered in position. By this arrangement the contact end 20 is fully protected from corrosion or accidental short circuiting such as might be caused by moisture collecting in the cap, and the cap is securely fixed in position. As already stated contact devices, as shown in Fig. 2, may be fixed at such points in the turbine as may be desirable. In the drawing and for illustrative purposes there is shown a contact device 25 carried by diaphragm 15 and projecting into the clearance between it and the adjacent wheel 17, and a contact device 26 carried by the casing wall 14 and projecting into the clearance between the casing and the bucket cover. The contact devices are fixed in suitable openings in the diaphragms, and the casing and the conductors 22 are all connected in parallel to a common lead wire 27. It will be understood that there are as many conductors 22 as there are contact devices, an indeterminate number being indicated in Fig. 1.

The circuit connections shown in Fig. 1 will be readily understood by an explanation of what takes place in case a contact device is operated. Assume for example that the diaphragm 15 deflects to such an extent that contact device 25 is brought into engagement with wheel 17. Almost instantly the end of the cap 18 and the insulation 21 are worn away bringing the end 20 of conductor 22 into engagement with the wheel 17, thereby grounding it on the turbine casing which is grounded as indicated at 28. A circuit is then closed from ground 28, through conductor 22, lead wire 27, conductor 29, switch 30, conductor 31, winding of relay 32 and battery 33 to ground 33ᵃ. This operates relay 32 bringing blades 34 and 35 into engagement with contacts 36 and 37. A holding circuit for relay 32 is thereby closed from ground 33ᵃ, battery 33, winding of relay 32, conductor 31, switch 30, conductor 29, conductor 38, blade 35, contact 37, and conductor 39 to ground at 40, and since signal bell 41 is in parallel to the winding of relay 32, it too is connected into this same circuit and will be operated. Also a circuit is closed through electromagnet or trip coil 13 as follows: line wire 42, conductor 43, contact 36, blade 34, conductor 44, switch 30, conductor 45, trip coil 13, and conductor 46 to line wire 47. Line wires 42 and 47 may lead from any suitable source of electrical energy. The trip coil 13 will thus be energized to trip the emergency valve mechanism 8 and shut down the turbine. In case the turbine is operating a generator, it may be desirable to operate the generator oil switch to disconnect the generator from the line and for this purpose conductors 48 may connect a trip coil for the generator switch in parallel with trip coil 13. To test the indicating apparatus and the emergency valve mechanism a short circuiting switch 49 is provided which when closed closes a circuit from ground 40 through conductor 39, conductor 50, switch 49, conductors 51, 27 and 29, switch 30, conductor 31, winding of relay 32, and battery 33 to ground at 33ᵃ. This operates the apparatus associated with the circuits the same as if one of the contact devices in the turbine were operated. By this means the operative conditions of the circuits may be tested at any time.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In an elastic-fluid turbine, a device which projects into a clearance space in the turbine, and signaling means which is actuated in case a moving part of the turbine comes into contact with said device.

2. In an elastic-fluid turbine, a device which projects into a clearance space in the turbine, and means which is actuated to shut down the turbine in case a moving part of the turbine comes into contact with said device.

3. In an elastic-fluid turbine, a device which projects into a clearance space in the turbine, and signaling means and means for shutting down the turbine both of which are actuated in case a moving part of the turbine comes into contact with said device.

4. In an elastic-fluid turbine, an electric contact device which projects into a clearance in the machine, and means in circuit with said contact device which gives an alarm in case a moving part of the machine comes into engagement with said contact device.

5. In an elastic-fluid turbine, an electric contact device which projects into a clearance in the machine, and means in circuit with said contact device which effects the shutting down of the turbine in case a moving part of the machine comes into engagement with said contact device.

6. In an elastic-fluid turbine, an electric contact device comprising an insulated wire with the insulation terminating short of the end of the conductor, and a cap which fits over the end of the wire, said contact device projecting into a clearance space in the machine, and electrically actuated means connected in circuit with said contact device whereby in case a moving part of the machine engages and wears away the end of said cap, a circuit will be closed to operate said electrically actuated means.

7. In an apparatus of the character described, a contact device comprising an insulated wire with the insulation terminating short of the end of the conductor, and a cap which fits over such end with its bottom spaced from the end of said conductor.

8. In an apparatus of the character described, a contact device comprising an insulated wire with the insulation terminating short of the end of the conductor, and a cap which fits over such end and is provided with insulation which serves to space the end of the conductor from the bottom of the cap.

9. The combination in an elastic-fluid turbine having a diaphragm and a wheel, of a contact device which projects into the clearance space between them and is actuated when said clearance space is impaired to a predetermined extent.

10. The combination in an elastic-fluid turbine having a rotor and a casing, of a contact device which projects into the clearance space between them and is actuated when the clearance space is impaired to a predetermined extent.

11. The combination in an elastic-fluid turbine having a casing and a rotor comprising a wheel, buckets thereon and a bucket cover for the buckets, of a contact device carried by the casing and projecting into the clearance between the casing and the rotor whereby the contact device will be actuated in case the bucket cover should come loose and engage it.

12. In an elastic-fluid turbine, an electric contact device which projects into a clearance in the machine and is actuated in case the clearance is impaired beyond a predetermined amount, a circuit for said contact device, a relay having its winding in said circuit, and a holding circuit for the relay and an indicating circuit which are closed when the relay is actuated.

13. In an elastic-fluid turbine having an emergency valve mechanism, an electric contact device which projects into a clearance in the machine and is actuated when such clearance is impaired beyond a predetermined amount, a circuit for said contact device, a relay having its winding in said circuit, a trip coil for said emergency valve mechanism, and a circuit for said trip coil which is controlled by said relay.

In witness whereof I have hereunto set my hand this 5th day of December, 1918.

OSCAR JUNGGREN.